(12) United States Patent
Gong

(10) Patent No.: US 12,446,556 B1
(45) Date of Patent: Oct. 21, 2025

(54) PARROT CAGE

(71) Applicant: Siying Gong, Beijing (CN)

(72) Inventor: Siying Gong, Beijing (CN)

(73) Assignee: Siying GONG, Beijing (CN)

( * ) Notice: Subject to any disclaimer, the term of this patent is extended or adjusted under 35 U.S.C. 154(b) by 0 days.

(21) Appl. No.: 19/049,992

(22) Filed: Feb. 10, 2025

(30) Foreign Application Priority Data

Dec. 10, 2024 (CN) .......................... 202411813634.9

(51) Int. Cl.
*A01K 31/06* (2006.01)

(52) U.S. Cl.
CPC .................................... *A01K 31/06* (2013.01)

(58) Field of Classification Search
CPC ...................................................... A01K 31/06
See application file for complete search history.

(56) References Cited

U.S. PATENT DOCUMENTS

| | | | | |
|---|---|---|---|---|
| 56,407 A * | 7/1866 | Gunther | ................. | A01K 31/06 119/467 |
| 1,998,787 A * | 4/1935 | Nyhagen | ................. | A01K 31/12 200/DIG. 3 |
| 3,041,911 A * | 7/1962 | Marder | ..................... | G10F 1/06 116/22 A |
| 3,847,120 A * | 11/1974 | Hicks | ..................... | A01K 15/02 119/713 |
| 4,038,639 A * | 7/1977 | Kuebler | ................. | A01M 29/06 340/573.2 |
| 7,418,925 B2 * | 9/2008 | Rutherford | .......... | A01K 15/025 359/850 |
| 9,713,318 B1 * | 7/2017 | Albawi | .................. | G08C 17/02 |
| 2006/0272591 A1 * | 12/2006 | Rutherford | .......... | A01K 15/025 119/467 |
| 2010/0237168 A1 * | 9/2010 | Cooper | ................ | A01K 63/006 239/72 |
| 2018/0235186 A1 * | 8/2018 | Masters | ................. | A01K 31/12 |

OTHER PUBLICATIONS

Japanese Office Action for Application No. 2025-011015, mailed Jun. 6, 2025 (4 pages).

* cited by examiner

*Primary Examiner* — Jessica B Wong
(74) *Attorney, Agent, or Firm* — Wiersch Law Group

(57) ABSTRACT

A parrot cage, including a cage body enclosing an accommodation cavity for allowing a parrot to move inside the accommodation cavity, and a training unit including a separator plate, a first grab rod and a conduction portion provided at each of two opposite ends of the first grab rod; the separator plate is provided with a player; the conduction portion includes an upright rod, a sliding sleeve and a support rod; a first end of the upright rod is fixed to a bottom of the accommodation cavity, and a second end of the upright rod is provided with a first guide rod; the sliding sleeve is sleeved on the second end of the upright rod, and a second guide rod is provided in the sliding sleeve; the sliding sleeve is connected to the first grab rod through the support rod and is movable along a first preset path.

10 Claims, 4 Drawing Sheets

PARROT CAGE

CROSS-REFERENCE TO RELATED APPLICATIONS

The present application claims priority to Chinese Patent Application No. 202411813634.9 filed on Dec. 10, 2024, the content of which is incorporated herein by reference in its entirety.

TECHNICAL FIELD

The present disclosure relates to the technical field of parrot feeding accessories, and in particular, to a parrot cage.

BACKGROUND

Parrots are colorful birds belonging to the order Psittaciformes, and have unique morphological characteristics and can imitate human language and chirping of other birds. When raising parrots artificially, a parrot cage is needed, but a traditional parrot cage cannot intelligently train the parrots to speak.

SUMMARY

A purpose of the present disclosure is to provide a parrot cage, aiming to solve the problem that a traditional parrot cage cannot intelligently train the parrots to speak.

An embodiment of the present disclosure provides a parrot cage, including: a cage body enclosing an accommodation cavity for allowing a parrot to move inside the accommodation cavity; and a training unit arranged in the accommodation cavity and including: a separator plate, a first grab rod, and a conduction portion provided at each of two opposite ends of the first grab rod. The separator plate is provided with a player configured to play a recording; the conduction portion includes an upright rod, a sliding sleeve and a support rod; a first end of the upright rod is fixed to a bottom of the accommodation cavity, a second end of the upright rod is provided with a first guide rod, the sliding sleeve is sleeved on the second end of the upright rod, a second guide rod is provided in the sliding sleeve, the sliding sleeve is connected to the first grab rod through the support rod, and the sliding sleeve is movable along a first preset path; and when the sliding sleeve is positioned at a start end of the first preset path, a preset distance is formed between the first guide rod and the second guide rod, and when the sliding sleeve is positioned at a tail end of the first preset path, the first guide rod is in contact with the second guide rod, such that the player plays the recording.

As for the parrot cage as described above, in an implementation manner, the upright rod is provided with a fixed ring and a first elastic member, and two opposite ends of the first elastic member abut against the fixed ring and the sliding sleeve, respectively, to apply an elastic force to the sliding sleeve, such that the sliding sleeve is capable of moving along the first preset path.

As for the parrot cage as described above, in an implementation manner, a second grab rod is further provided in the accommodation cavity, and two opposite ends of the second grab rod are connected to the separator plate, respectively.

As for the parrot cage as described above, in an implementation manner, the separator plate is further provided with a training mirror that is arranged at a side facing the first grab rod.

As for the parrot cage as described above, in an implementation manner, a feeding unit is further provided in the accommodation cavity and is arranged at a side of the separator plate away from the training unit, the feeding unit includes a cover body and two feed boxes, the two feed boxes are fixed to a bottom of the accommodation cavity, the cover body is movable along a second preset path; and when the cover body is positioned at a start end of the second preset path, the cover body closes the two feed boxes, and when the cover body is positioned at a tail end of the second preset path, the cover body is away from the two feed boxes to open the two feed boxes.

As for the parrot cage as described above, in an implementation manner, the feeding unit includes a push portion connected to the cover body, and the push portion is configured to drive the cover body to move along the second preset path.

As for the parrot cage as described above, in an implementation manner, the push portion includes a third grab rod, a push rod, and a supporting rod; the third grab rod is movable along a third preset path, a first end of the push rod is connected to the third grab rod, the push rod is provided with a rotation ring, the supporting rod passes through the rotation ring, each of the two feed boxes is provided with a rotation hole, and each of two opposite ends of the supporting rod is connected to the rotation hole, respectively; and when the third grab rod is positioned at a start end of the third preset path, a second end of the push rod abuts against the cover body, and the cover body is positioned at the start end of the second preset path, and when the third grab rod is positioned at a tail end of the third preset path, the cover body is positioned at the tail end of the second preset path.

As for the parrot cage as described above, in an implementation manner, the cover body includes a push plate and two cover plates arranged at two opposite ends of the push plate; and when the third grab rod is positioned at the start end of the third preset path, the second end of the push rod abuts against the push plate, the two cover plates are in one-to-one correspondence to the two feed boxes, and each of the two cover plates is rotatably connected to a respective one of the two feed boxes.

As for the parrot cage as described above, in an implementation manner, a blocking unit is further provided in the accommodation cavity and is arranged at a side of the separator plate facing the training unit, and the blocking unit is connected to the first grab rod; and when the sliding sleeve is positioned at the start end of the first preset path, the blocking unit closes the player, and when the sliding sleeve is positioned at the tail end of the first preset path, the blocking unit allows the player to play the recording.

As for the parrot cage as described above, in an implementation manner, the blocking unit includes a sleeve ring movable along the fourth preset path, a guide portion configured to guide the sleeve ring to move along the fourth preset path, and a blocking portion configured to block a sound outlet of the player; the guide portion includes a first guide block, a second guide block, a pull rod, a pull rope and a guide post, and the first guide block is arranged at the separator plate, an end of the guide post is inserted into the first guide block, another end of the guide post is connected to the sleeve ring, each of two opposite ends of the sleeve ring is provided with the blocking portion, the guide post is provided with a second elastic member, and two opposite ends of the second elastic member abut against the sleeve ring and the first guide block, respectively; the second guide block is arranged at a top of the accommodation cavity, an end of the pull rod is connected to the first grab rod, an end of the pull rope is connected to the guide post, and another end of the pull rope passes through the second guide block and then is connected to another end of the pull rod; and when the sliding sleeve is positioned at the start end of the first preset path, the sleeve ring is positioned at a start end of the fourth preset path, and the blocking cover blocks the sound outlet of the player, and when the sliding sleeve is positioned at the tail end of the first preset path, the sleeve ring is positioned at a tail end of the fourth preset path, and the blocking cover is away from the sound outlet of the player, to allow the player to play the recording.

Compared with the related art, according to the present disclosure, the training unit is provided in the cage body, when a parrot falls onto the first grab rod, the sliding sleeve is driven to move along a preset path due to the parrot's own gravity, until the first guide rod is in contact with the second guide rod, so that the player plays the recording, thereby realizing the speaking training of the parrot. Without needing the cooperation of a human being, the parrot can imitate and learn language at any time.

REFERENCE SIGNS

10—cage body, 11—accommodation cavity, 12—arc-shaped window, 13—blocking door, 14—hook;
20—training unit, 21—separator plate, 211—player, 212—training mirror, 22—first grab rod, 23—conduction portion, 231—upright rod, 232—sliding sleeve, 233—support rod, 234—first guide rod, 235—second guide ring, 236—fixed ring, 237—first elastic member, 24—second grab rod, 25—connection post;
30—feeding unit, 31—cover body, 311—push plate, 312—cover plate, 313—rotation block, 32—feed box, 321—rotation hole, 322—groove, 33—push portion, 331—third grab rod, 332—push rod, 333—supporting rod, 334—rotation ring;
40—blocking unit, 41—guide portion, 411—first guide block, 412—second guide block, 413—pull rod, 414—pull rope, 415—guide post, 416—second elastic member, 42—sleeve ring, 43—blocking portion, 431—blocking cover, 432—connection rod.

DESCRIPTION OF EMBODIMENTS

The embodiments described below with reference to the drawings are exemplary and merely used to explain the present disclosure, and cannot be construed as limiting the present disclosure.

Referring to FIG. 1 to FIG. 7, some embodiments of the present disclosure provide a parrot cage, including a cage body 10 and a training unit 20.

Figure 1:
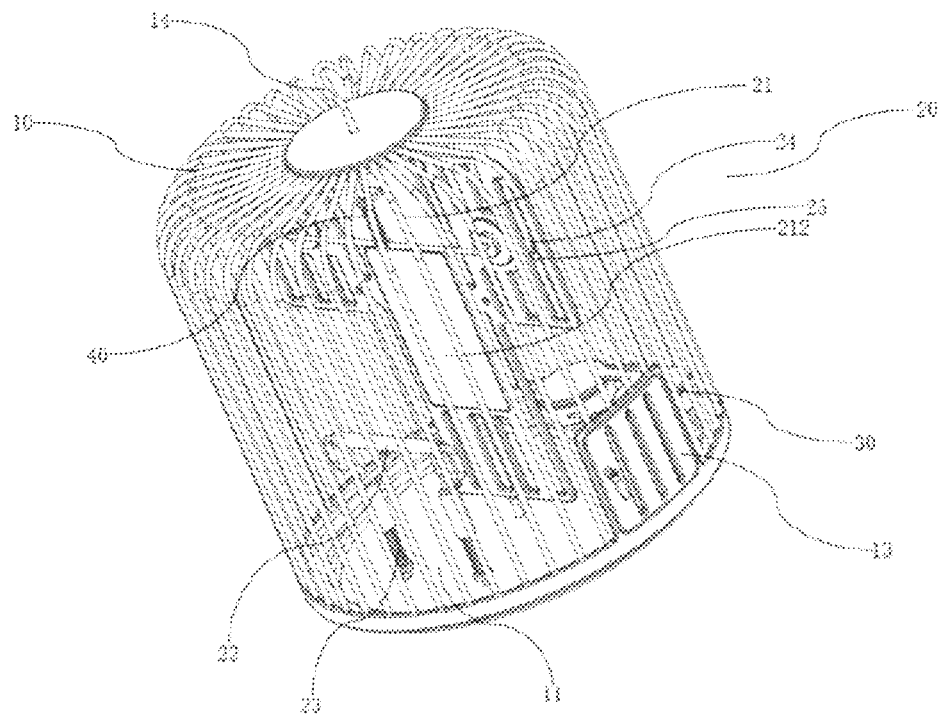
FIG. 1 is a perspective view of a parrot cage according to an embodiment of the present disclosure.
Figure 2:
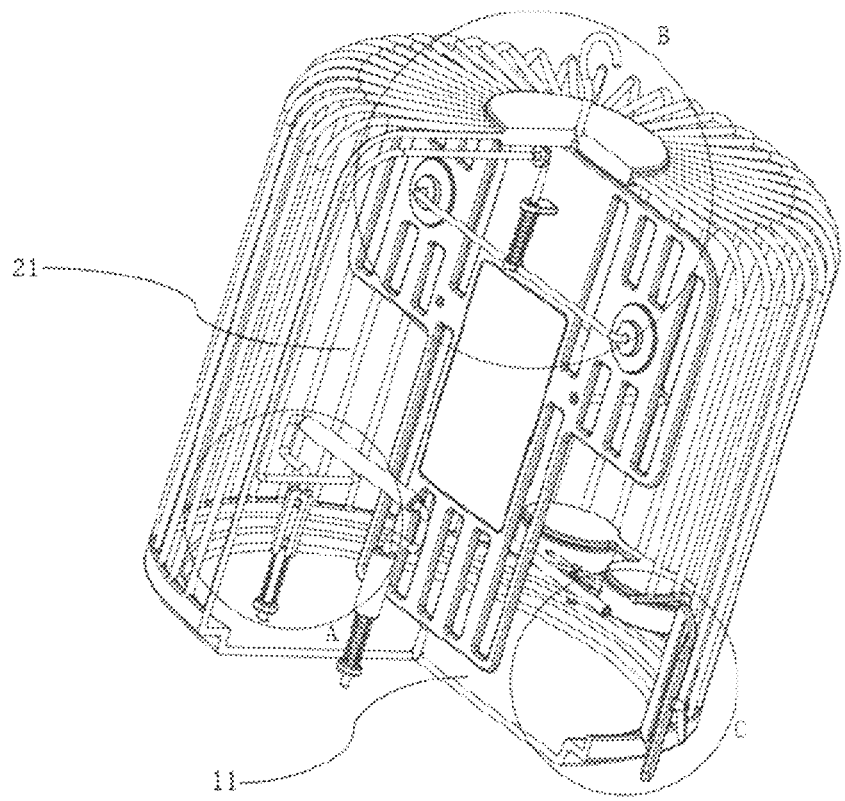
FIG. 2 is a partial sectional view of a parrot cage according to an embodiment of the present disclosure.

The cage body 10 encloses an accommodation cavity 11 for allowing a parrot to move. The training unit 20 is arranged in the accommodation cavity 11, and includes a separator plate 21, a first grab rod 22 and a conduction portion 23. Referring to FIG. 1 and FIG. 2, the separator plate 21 is formed as a T-shaped structure, and an end of the separator plate 21 is fixed to a bottom of the accommodation cavity 11. The separator plate 21 extends upwards from the bottom of the accommodation cavity 11 to divide the accommodation cavity 11 to be two parts. The separator plate 21 of the T-shaped structure enables a reserved space to be formed between the separator plate 21 and the cage body 10, and the reserved space allows the parrot to move back and forth in the accommodation cavity 11. According to some embodiments of the present disclosure, a player 211 is provided at an end of the separator plate 21 away from the bottom of the accommodation cavity 11, and the player 211 is configured to play a recording to facilitate the parrot to imitate and learn. Two players 211 are provided and are symmetrically arranged at two sides of the separator plate 21. The player 211 may be a device capable of storing and playing daily dialogue training sentences in the related art, no limitation is made herein.

Figure 3:
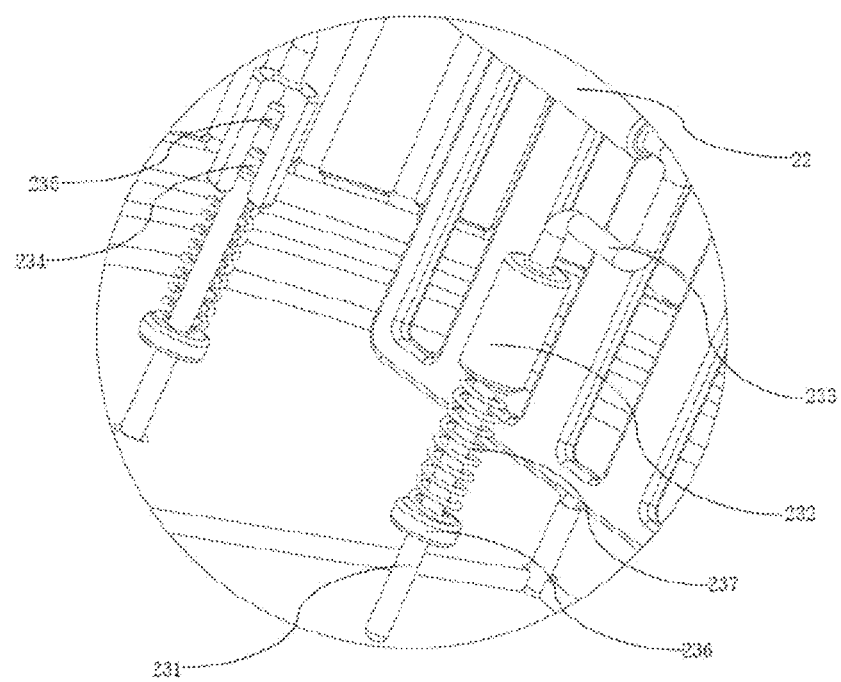
FIG. 3 is an enlarged view of part A shown in FIG. 2.

Further, referring to FIG. 1 and FIG. 3, each of two opposite ends of the first grab rod 22 is provided with a conduction portion 23, and the conduction portion 23 includes an upright rod 231, a sliding sleeve 232 and a support rod 233. A first end of the upright rod 231 is fixed to the bottom of the accommodation cavity 11, and a second end of the upright rod 231 is provided with a first guide rod 234. The sliding sleeve 232 is sleeved on the second end of the upright rod 231, and the first guide rod 234 is arranged inside the sliding sleeve 232. An end in the sliding sleeve 232 away from the second end of the upright rod 231 is provided with a second guide rod 235, and the sliding sleeve 232 is connected to an end of the first grab rod 22 through the support rod 233.

In order to realize intelligent language training of the parrot, according to some embodiments of the present disclosure, the sliding sleeve 232 may move along a first preset path, which is a path along which the sliding sleeve 232 moves along an axial direction of the upright rod 231. When the parrot has not fallen onto the first grab rod 22, the sliding sleeve 232 is positioned at a start end of the first preset path, and the first guide rod 234 is not in contact with the second guide rod 235 and a certain distance is kept between the first guide rod 234 and the second guide rod 235, so that the player 211 cannot be turned on. When the parrot falls onto the first grab rod 22, the first grab rod 22 falls due to the parrot's own gravity, driving the support rod 233 to move downward, thereby driving each of the sliding sleeves 232 at two ends of the first grab rod 22 to move along the first preset path. When the sliding sleeve 232 moves to a tail end of the first preset path, the first guide rod 234 is in contact with the second guide rod 235, so that the player 211 is turned on to play the recording. When the parrot leaves the first grab rod 22, the sliding sleeve 232 returns to the start end of the first preset path, and the first guide rod 234 is not contact with the second guide rod 235, thereby disconnecting the conductive state, so that the player 211 stops playing the recording. In this way, the player 211 can be controlled to automatically start and stop according to a real-time position of the parrot without manual intervention, thereby realizing intelligent speaking training of the parrot.

According to an embodiment of the present disclosure, after the parrot leaves the first grab rod 22, in order to enable the sliding sleeve 232 to return to the start end of the first preset path, a fixed ring 236 and a first elastic member 237 are provided at the upright rod 231. The fixed ring 236 is arranged at an end of the upright rod 231 away from the sliding sleeve 232, and two opposite ends of the first elastic member 237 abut against the fixed ring 236 and the sliding sleeve 232, respectively. In the process that the sliding sleeve 232 moves towards the tail end of the first preset path, the first elastic member 237 is compressed to generate elastic deformation to accumulate an elastic force. After the parrot leaves the first grab rod 22, the first elastic member 237 applies the accumulated elastic force to the sliding sleeve 232, to drives the sliding sleeve 232 to move towards the start end of the first preset path.

In a feasible implementation, the first elastic member 237 is a spring that is sleeved on the upright rod 231, and two opposite ends of the spring abut against the fixed ring 236 and the sliding sleeve 232, respectively. When the parrot is located at the first grab rod 22 to drive the sliding sleeve 232 to move towards the tail end of the first preset path, the spring is compressed and deformed due to a downward force of the sliding sleeve 232, thereby accumulating an elastic force. After the parrot leaves the first grab rod 22, the spring applies the accumulated elastic force to the sliding sleeve 232, so that the sliding sleeve 232 returns to the tail end of the first preset path, and the spring stretches to a natural state.

In other embodiments of the present disclosure, other structures or components that can drive the sliding sleeve 232 to return to the start end of the first preset path may be adopted, no limitation is made herein.

Figure 6:
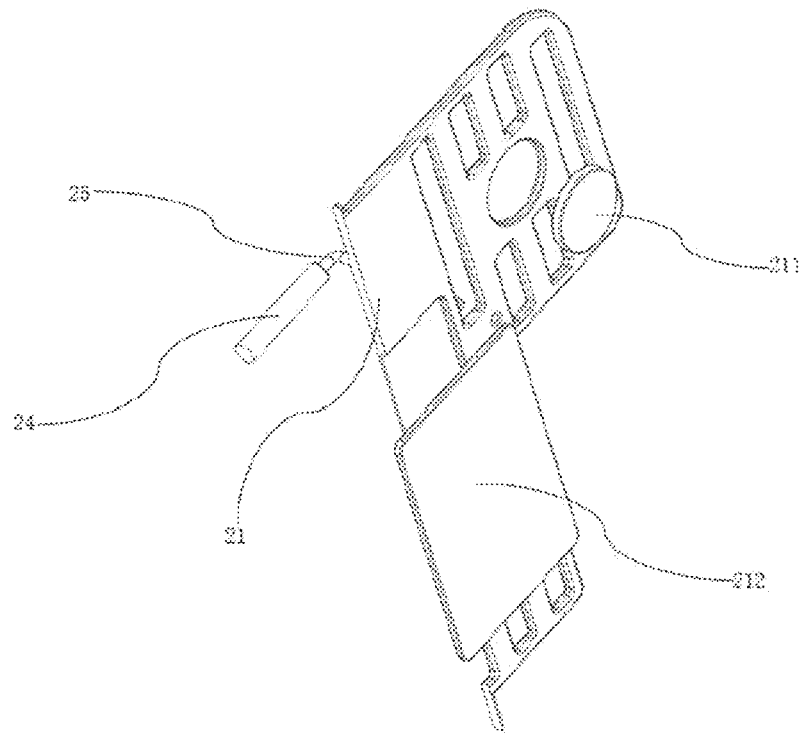
FIG. 6 is an exemplary installation schematic diagram of a second grab rod according to an embodiment of the present disclosure.

When the parrot does not stay on the first grab rod 22, in order to provide a place for the parrot to rest, a second grab rod 24 is further provided in the accommodation cavity 11. The second grab rod 24 is arranged at a side of the separator plate 21 away from the training unit 20. Referring to FIG. 1 and FIG. 6, according to an embodiment of the present disclosure, each of two opposite ends of the second grab rod 24 is connected to the separator plate 21 through an L-shaped connection post 25, so that the parrot has enough space to stand on the second grab rod 24.

Figure 4:
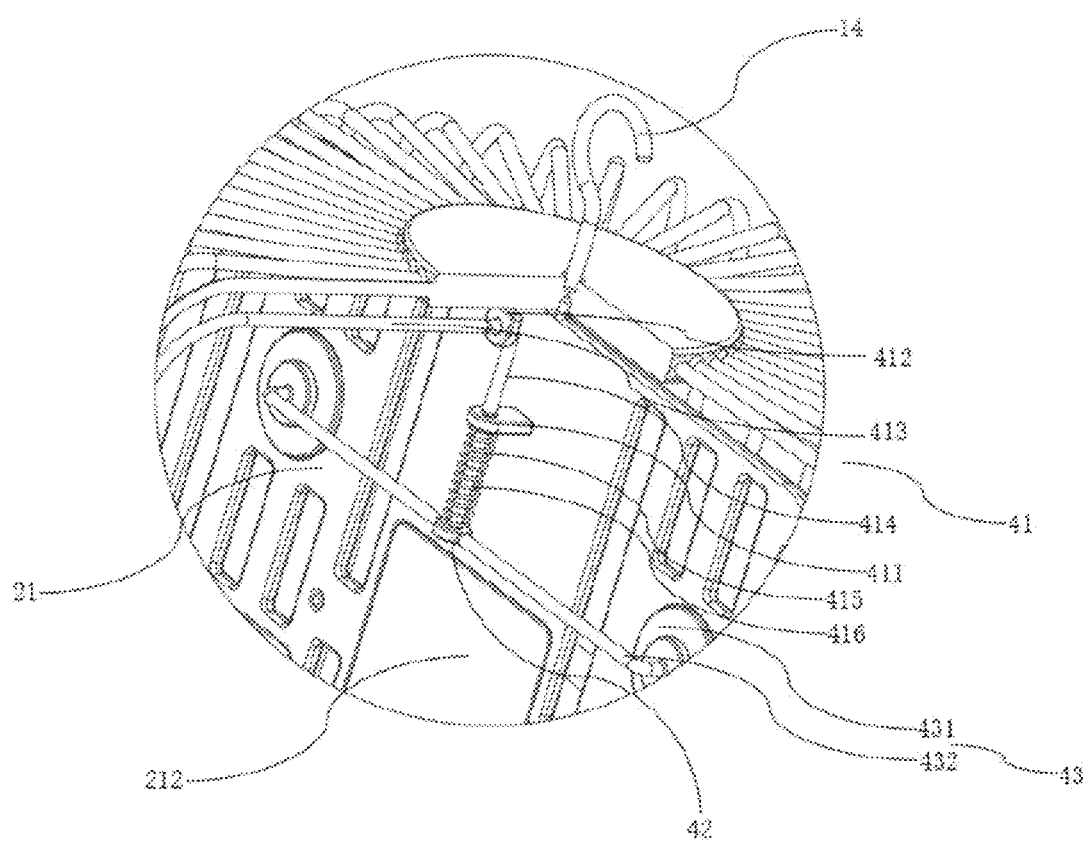
FIG. 4 is an enlarged view of part B shown in FIG. 2.

According to some embodiments of the present disclosure, referring to FIG. 1, FIG. 4 and FIG. 6, when playing the recording, in order to create a more realistic dialogue scenario, a training mirror 212 is further provided at the separator plate 21, and the training mirror 212 is arranged at the separator plate 21 facing towards the first grab bar 22. When the parrot falls on the first grab bar 22 and the player 211 plays the recording, the parrot can have a virtual object to talk to when imitating the human language, thereby improving the dialogue training effect of the parrot.

Figure 7:
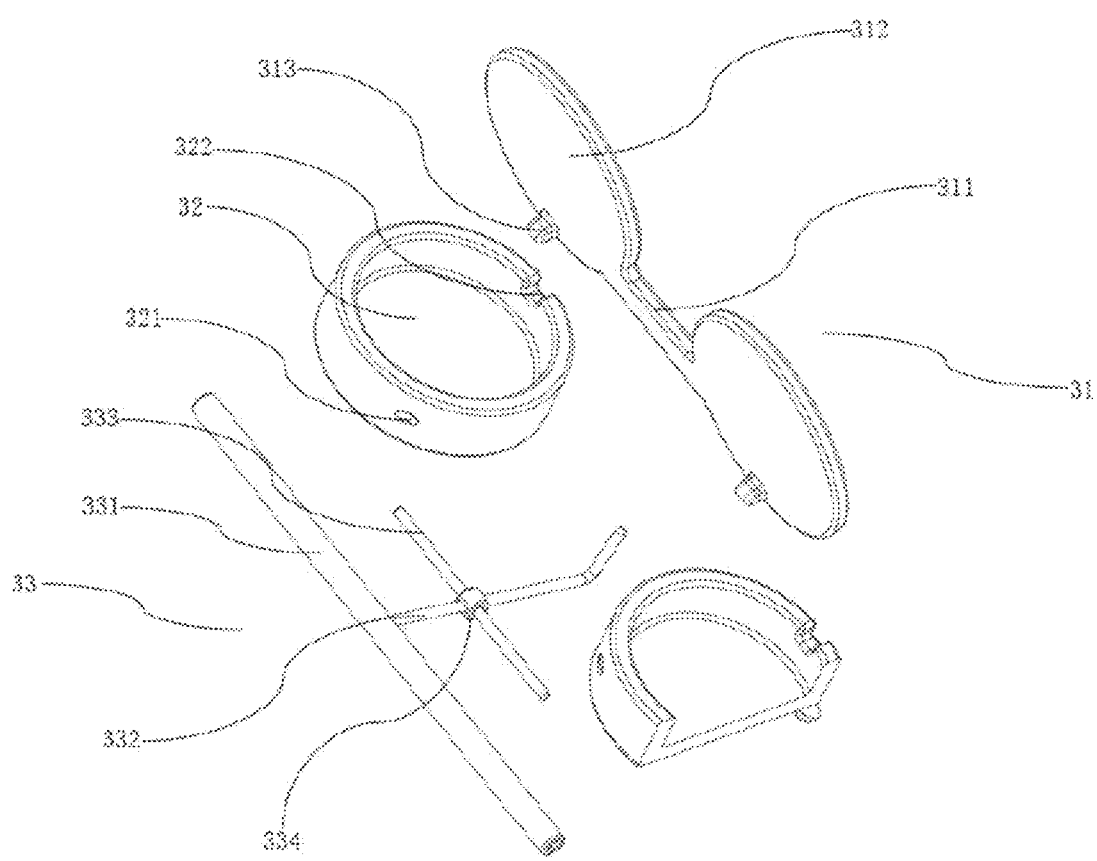
FIG. 7 is an exploded view of a feeding unit of a parrot cage according to an embodiment of the present disclosure.

When a traditional parrot cage is in use, the excrement of the parrot easily falls into food and water, thereby contaminating food and water sources. In order to solve these problems, according to some embodiments of the present disclosure, a feeding unit 30 is further provided in the accommodation cavity 11, and the feeding unit 30 is arranged at a side of the separator plate 21 away from the training unit 20. Referring to FIG. 1 and FIG. 7, the feeding unit 30 includes a cover body 31 and two feed boxes 32, and the two feed boxes 32 are fixed at the bottom of the accommodation cavity 11. The cover body 31 can move along a second preset path. When the cover body 31 is positioned at a start end of the second preset path, the two feed boxes 32 are closed by the cover body 31, and the parrot cannot eat and drink water. Meanwhile, the excrement of the parrot cannot fall into the two feed boxes 32, thereby avoiding the pollution to food and water sources. When the parrot needs to eat food or drink water, the cover body 31 moves to a tail end of the second preset path, causing the cover body 31 to move away from the feed boxes 32, and the two feed boxes 32 are opened to allow the parrot to eat food or drink water successfully.

The movement of the cover body 31 along the second preset path can be carried out according to feeding requirements of the parrot. When the parrot needs to eat food, the cover body 31 can move to the tail end of the second preset path. When the parrot does not need to eat food, the cover body 31 can be kept at the start end of the second preset path, thereby ensuring that food and water sources can be prevented from contamination to the greatest extent. According to some embodiments of the present disclosure, the feeding unit 30 further includes a push portion 33 that is connected to the cover body 31, and the push portion 33 is configured to realize reciprocating of the cover body 31 along the second preset path.

In a feasible implementation, referring to FIG. 7, the push portion 33 includes a third grab rod 331, a push rod 332, and a supporting rod 333. The third grab rod 331 can move along a third preset path. A first end of the push rod 332 is connected to the third grab rod 331, and a middle section of the push rod 332 is provided with a rotation ring 334. The supporting rod 333 passes through the rotation ring 334. Each of the two feed boxes 32 is provided with a rotation hole 321, and two opposite ends of the supporting rod 333 are connected to the rotation holes 321, respectively, to support the push rod 332 to move along the third preset path.

For example, the third preset path is a path along which the third grab rod 331 rotates with an axis of the rotation ring 334 being as a center line. When the third grab rod 331 is positioned at a start end of the third preset path, the second end of the push rod 332 abuts against the cover body 31. When the third grab rod 331 moves towards a tail end of the third preset path, the push rod 332 pushes the cover body 31 to move along the second preset path. When the third grab rod 331 moves to the tail end of the third preset path, the cover body 31 moves to the tail end of the second preset path.

Further, continuing to refer to FIG. 7, the cover body 31 includes a push plate 311 and two cover plates 312. The two cover plates 312 are arranged at two opposite ends of the push plate 311. When the third grab rod 331 is positioned at the start end of the third preset path, the second end of the push rod 332 abuts against the push plate 311, the two cover plates 312 one-to-one correspond to the two feed boxes 32, and each of the two cover plates 312 is rotatably connected to a respective one of the two feed boxes 32. When the cover body 31 is positioned at the start end of the second preset path (that is, the push plate 311 is positioned at the start end of the second preset path), the two cover plates 312 close the respective feed boxes 32. When the third push rod 332 moves along the third preset path, the push plate 311 moves along the second preset path, to drive the two cover plates 312 to move along the second preset path, thereby opening the respective feed box 32.

In an example, the feed box 32 is provided with a groove 322, and the corresponding cover plate 312 is provided with a rotation block 313. The rotation block 313 is rotatably connected into the groove 322. The second preset path is a path along which the push plate 311 rotates with a rotating axis of the rotation block 313 being as a center line. The rotation block 313 may be connected to the groove 322 in a rotatable connection manner in the related art, no limitation is made herein.

Based on the above-described embodiments of the present disclosure, when the parrot needs to eat food, the process of opening and closing the feed box 32 is as follows: the parrot falls onto the third grab rod 331, and due to the parrot's own gravity, the third grab rod 331 rotates downward, to drive the push rod 332 to push the push plate 311 to rotate towards the tail end of the second preset path, and then drive the two cover plates 312 to move away from the feed box 32; and when the parrot finishes eating food and leaves the third grab bar 331, the cover body 31 falls back to the start end of the second preset path due to the its own gravity, and the two cover plates 312 close the two feed boxes 32, meanwhile, the third grab rod 331 returns to the start end of the third preset path when the cover body 31 falls.

In order to automatically start and stop playing the recording of the player 211, so that when the parrot falls onto the first grab rod 22, the player 211 plays the recording, and when the parrot leaves the first grab rod 22, the player 211 stops playing the recording, according to some embodiments of the present disclosure, referring to FIG. 1, a blocking unit 40 is further provided in the accommodation cavity 11, and the blocking unit 40 is arranged at a side of the separator plate 21 facing the training unit 20. When the parrot falls onto the first grab rod 22 to drive the sliding sleeve 232 to move along the first preset path, the blocking unit 40 gradually turns on the player 211; and when the sliding sleeve 232 is positioned at the tail end of the first preset path, the blocking unit 40 is away from the player 211, so that the player 211 can play the recording. When the parrot leaves the first grab rod 22 and the sliding sleeve 232 returns to the start end of the first preset path, the blocking unit 40 blocks a sound outlet of the player 211, to stop playing the recording.

In a feasible implementation, referring to FIG. 4, the blocking unit 40 includes a guide portion 41, a sleeve ring 42, and a blocking portion 43. The sleeve ring 42 can move along a fourth preset path that is a path along which the sleeve ring 42 moves up and down along a gravity direction. The guide portion 41 is configured to guide the sleeve ring 42 to move along the fourth preset path, and the blocking portion 43 is configured to block a sound outlet of the player 211.

The guide portion 41 includes a first guide block 411, a second guide block 412, a pull rod 413, a pull rope 414, and a guide post 415. The first guide block 411 is fixed to the separator plate 21, an end of the guide post 415 is inserted into the first guide block 411, and another end of the guide post 415 is connected to the sleeve ring 42. Each of two opposite ends of the sleeve ring 42 is connected to the blocking portion 43. Since two players 211 are symmetrically arranged at the separator plate 21, two blocking portions 43 one-to-one correspond to the two players 211, so that the blocking portions 43 at two ends of the sleeve ring 42 are configured to block sound outlet holes of the respective players 211. The second guide block 412 is arranged at a top of the accommodation cavity 11. An end of the pull rod 413 is connected to the first grab rod 22. An end of the pull rope 414 is connected to the guide post 415, and another end of the pull rope 414 passes through the second guide block 412 and then is connected to another end of the pull rod 413. As a result, when the sliding sleeve 232 moves towards the tail end of the first preset path due to the parrot's own gravity on the first grab rod 22, the pull rod 413 moves synchronously with the movement of the first grab rod 22, to drive the pull rope 413 to move. In this way, it can cause the guide post 415 and the sleeve ring 42 to rise, so as to drive the blocking portions 43 at two ends of the sleeve ring 42 to move upwards to expose the sound outlets of the players 211, thereby playing the recording.

In order to enable the sleeve ring 42 to move along the fourth preset path, a second elastic member 416 is provided at the guide post 415, and two opposite ends of the second elastic member 416 abut against the sleeve ring 42 and the first guide block 411, respectively. When the sleeve ring 42 moves upwards, the second elastic member 416 is compressed and elastically deformed to accumulate an elastic force. When the sliding sleeve 232 moves towards the start end of the first preset path, the elastic force accumulated by the second elastic member 416 is applied to the sleeve ring 42, to drive the sleeve ring 42 to move downwards to the blocking portion 43, so as to block the sound outlet of the player 211. In an example, the second elastic member 416 may be a spring that is sleeved on the guide post 415, and two ends of the spring abut against the first guide block 411 and the sleeve ring 42, respectively.

In an example, the blocking portion 43 includes a blocking cover 431 and a connection rod 432. An end of the connection rod 432 is connected to the blocking cover 431, and another end of the connection rod 432 is connected to a side of the sleeve ring 42. The blocking cover 431 is attached to a surface of the separator plate 21. When the sleeve ring 42 is positioned at the start end of the fourth preset path, the blocking cover 431 blocks the sound outlet of the player 211. When the sleeve ring 42 moves towards a tail end of the fourth preset path, the blocking cover 431 moves along the surface of the separator plate 21, to expose the sound outlet of the player 211.

Figure 5:
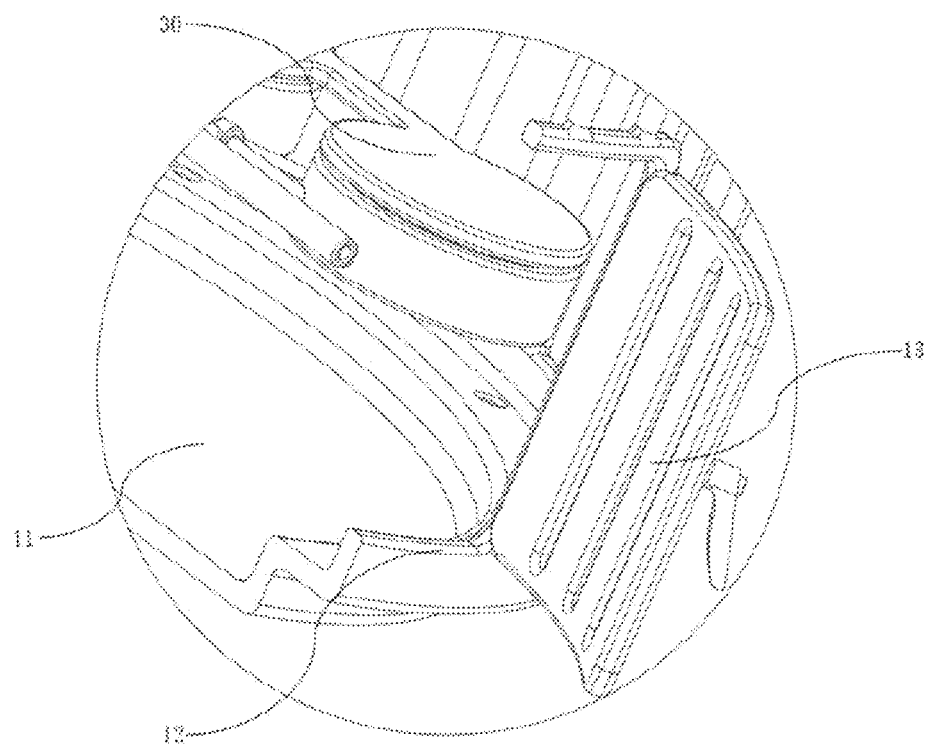
FIG. 5 is an enlarged view of part C shown in FIG. 2.

Referring to FIG. 4 and FIG. 5, according to some embodiments of the present disclosure, a lower end of the cage body 10 of the parrot cage is further provided with an arc-shaped window 12, and a blocking door 13 is hinged at the arc-shaped window 12, thereby facilitating the entry and exit of the parrot. A rotation hole is formed at the middle of a top end of the cage body 10, and a hook 14 is rotatably inserted into the rotation hole, thereby facilitating hanging the parrot cage at a proper position.

The structures, features and effects of the present disclosure are described above in details according to the embodiments shown in the drawings, buts it should be noted that the above description merely illustrates some preferred embodiments of the present disclosure, and the present disclosure is not limited to a scope of the embodiments of the present disclosure shown in the drawings. Any changes made according to a concept of the present disclosure, or modified into equivalent embodiments with equivalent changes, which still do not beyond a spirit covered by the specification and the drawings, shall fall within a scope of the present disclosure.

What is claimed is:

1. A parrot cage, comprising:
   a cage body enclosing an accommodation cavity for allowing a parrot to move inside the accommodation cavity; and
   a training unit arranged in the accommodation cavity and comprising: a separator plate, a first grab rod, and a conduction portion provided at each of two opposite ends of the first grab rod,
   wherein the separator plate is provided with a player configured to play a recording; the conduction portion comprises an upright rod, a sliding sleeve and a support rod; a first end of the upright rod is fixed to a bottom of the accommodation cavity, a second end of the upright rod is provided with a first guide rod, the sliding sleeve is sleeved on the second end of the upright rod, a second guide rod is provided in the sliding sleeve, the sliding sleeve is connected to the first grab rod through the support rod, and the sliding sleeve is movable along a first preset path; and wherein when the sliding sleeve is positioned at a start end of the first preset path, a preset distance is formed between the first guide rod and the second guide rod, and when the sliding sleeve is positioned at a tail end of the first preset path, the first guide rod is in contact with the second guide rod, such that the player plays the recording.

2. The parrot cage according to claim 1, wherein the upright rod is provided with a fixed ring and a first elastic member, and two opposite ends of the first elastic member abut against the fixed ring and the sliding sleeve, respectively, to apply an elastic force to the sliding sleeve, such that the sliding sleeve is capable of moving along the first preset path.

3. The parrot cage according to claim 1, wherein a second grab rod is further provided in the accommodation cavity, and two opposite ends of the second grab rod are connected to the separator plate, respectively.

4. The parrot cage according to claim 1, wherein the separator plate is further provided with a training mirror that is arranged at a side facing the first grab rod.

5. The parrot cage according to claim 1,
wherein a feeding unit is further provided in the accommodation cavity and is arranged at a side of the separator plate away from the training unit, the feeding unit comprises a cover body and two feed boxes, the two feed boxes are fixed to a bottom of the accommodation cavity, the cover body is movable along a second preset path; and wherein when the cover body is positioned at a start end of the second preset path, the cover body closes the two feed boxes, and when the cover body is positioned at a tail end of the second preset path, the cover body is away from the two feed boxes to open the two feed boxes.

6. The parrot cage according to claim 5, wherein the feeding unit comprises a push portion connected to the cover body, and the push portion is configured to drive the cover body to move along the second preset path.

7. The parrot cage according to claim 6,
wherein the push portion comprises a third grab rod, a push rod, and a supporting rod;
wherein the third grab rod is movable along a third preset path, a first end of the push rod is connected to the third grab rod, the push rod is provided with a rotation ring, the supporting rod passes through the rotation ring, each of the two feed boxes is provided with a rotation hole, and each of two opposite ends of the supporting rod is connected to the rotation hole, respectively; and
wherein when the third grab rod is positioned at a start end of the third preset path, a second end of the push rod abuts against the cover body, and the cover body is positioned at the start end of the second preset path, and when the third grab rod is positioned at a tail end of the third preset path, the cover body is positioned at the tail end of the second preset path.

8. The parrot cage according to claim 7,
wherein the cover body comprises a push plate and two cover plates arranged at two opposite ends of the push plate; and
wherein when the third grab rod is positioned at the start end of the third preset path, the second end of the push rod abuts against the push plate, the two cover plates are in one-to-one correspondence to the two feed boxes, and each of the two cover plates is rotatably connected to a respective one of the two feed boxes.

9. The parrot cage according to claim 1,
wherein a blocking unit is further provided in the accommodation cavity and is arranged at a side of the separator plate facing the training unit, and the blocking unit is connected to the first grab rod; and
wherein when the sliding sleeve is positioned at the start end of the first preset path, the blocking unit closes the player, and when the sliding sleeve is positioned at the tail end of the first preset path, the blocking unit allows the player to play the recording.

10. The parrot cage according to claim 9,
wherein the blocking unit comprises a sleeve ring movable along the fourth preset path, a guide portion configured to guide the sleeve ring to move along the fourth preset path, and a blocking portion configured to block a sound outlet of the player;
wherein the guide portion comprises a first guide block, a second guide block, a pull rod, a pull rope and a guide post, and wherein the first guide block is arranged at the separator plate, an end of the guide post is inserted into the first guide block, another end of the guide post is connected to the sleeve ring, each of two opposite ends of the sleeve ring is provided with the blocking portion, the guide post is provided with a second elastic member, and two opposite ends of the second elastic member abut against the sleeve ring and the first guide block, respectively;
wherein the second guide block is arranged at a top of the accommodation cavity, an end of the pull rod is connected to the first grab rod, an end of the pull rope is connected to the guide post, and another end of the pull rope passes through the second guide block and then is connected to another end of the pull rod; and
wherein when the sliding sleeve is positioned at the start end of the first preset path, the sleeve ring is positioned at a start end of the fourth preset path, and the blocking cover blocks the sound outlet of the player, and when the sliding sleeve is positioned at the tail end of the first preset path, the sleeve ring is positioned at a tail end of the fourth preset path, and the blocking cover is away from the sound outlet of the player, to allow the player to play the recording.

\* \* \* \* \*